Dec. 27, 1960     H. W. GRONEMEYER     2,965,960
METHOD OF HOT FORMING METALLIC ARTICLES
Filed March 25, 1957     8 Sheets-Sheet 1

INVENTOR.
HERBERT W. GRONEMEYER
BY Alfred R. Fuchs
ATTORNEY

Dec. 27, 1960 H. W. GRONEMEYER 2,965,960
METHOD OF HOT FORMING METALLIC ARTICLES
Filed March 25, 1957 8 Sheets-Sheet 3

INVENTOR.
HERBERT W. GRONEMEYER
BY Alfred R. Fuchs
ATTORNEY

INVENTOR.
HERBERT W. GRONEMEYER
BY Alfred R. Fuchs
ATTORNEY

Dec. 27, 1960     H. W. GRONEMEYER     2,965,960
METHOD OF HOT FORMING METALLIC ARTICLES
Filed March 25, 1957     8 Sheets-Sheet 6

INVENTOR.
HERBERT W. GRONEMEYER
BY
Alfred R. Fuchs
ATTORNEY

Dec. 27, 1960 H. W. GRONEMEYER 2,965,960
METHOD OF HOT FORMING METALLIC ARTICLES
Filed March 25, 1957 8 Sheets-Sheet 7

INVENTOR.
HERBERT W. GRONEMEYER
BY
Alfred R. Fuchs
ATTORNEY

Dec. 27, 1960 H. W. GRONEMEYER 2,965,960
METHOD OF HOT FORMING METALLIC ARTICLES
Filed March 25, 1957 8 Sheets-Sheet 8

INVENTOR.
HERBERT W. GRONEMEYER
BY Alfred R. Fuchs
ATTORNEY

United States Patent Office 2,965,960
Patented Dec. 27, 1960

2,965,960

METHOD OF HOT FORMING METALLIC ARTICLES

Herbert W. Gronemeyer, Kansas City, Mo., assignor to Armco Steel Corporation, a corporation of Ohio Filed Mar. 25, 1957, Ser. No. 648,188

5 Claims. (Cl. 29—417)

My invention relates to a method of hot forming metallic articles.

It is a particular purpose of my invention to provide a new and improved method of making scale free metallic articles by a hot forging method. In forming articles by a hot forging method from rod or bar-like metal stock, the heating of the stock to a forging heat to provide for such plasticity thereof that the same can be forged, causes the formation of scale on the stock. It is highly desirable to remove the scale from the stock before introducing the stock to the forging dies in order to produce a more satisfactory product and to avoid damage to the dies by the hard scale.

My improved method accomplishes the removal of the scale from the stock prior to shaping the same by pressure between dies, without the necessity of providing a large amount of apparatus for holding slugs from which the articles are formed, as is necessary in previously known methods of providing scale free blanks for forging articles between dies. My method is adaptable for use in connection with the typical standard type of forging machine such as is now used for forging articles from slugs sheared from rod-like members, by the addition of only simple apparatus thereto, that can be easily applied to a machine of this character.

In order to remove the scale from the heated stock in plastic condition suitable for forging and have the stock free from scale when the forging operation, or operations, take place, it is necessary that the scale be removed while the stock is still in a plastic condition suitable for forging, and the forging operation be carried out without any reheating of the blank to be forged. Where a slug is cut or sheared from rod-like or similar stock that has been heated to a forging heat and scale is removed therefrom after the shearing off of the slug, rather complex apparatus is required in order to handle the slug during the scale removal and forging operations. By the use of my improved method all complex handling apparatus, that is required for the removal of scale from a slug and forging the de-scaled slug, is eliminated. This is accomplished by removing the scale from a suitable length of the stock at one end portion of the stock, which is ordinarily of great length, as it may be supplied to the machine in coils or in a similar manner. The amount of said stock extending from said end portion, that has the scale removed therefrom, is definitely determined by my improved method and all of the de-scaled portion thereof is sheared from the remainder of the stock after it has been de-scaled and is immediately move to the forging dies in a manner that is well known and is substantially standardized, as respects slugs cut off from stock for use as blanks in standard forging machines in which no de-scaling of the stock is required, such as machines for forging grinding balls.

In carrying out my improved method, rod-like metal stock is heated to a plastic state suitable for forging, a predetermined length of an end portion of said stock is upset while it is in the heated plastic state to crack the scale off the same, the upset portion of the stock is sheared off to provide a slug of the proper size for forming between the dies of the forging machine, and die shaping of the slug is done before it cools below forging heat. More specifically, the stock is gripped at a predetermined distance from one end thereof to provide a free portion of the stock of a predetermined length that extends from the gripped portion to the end adjacent which it is gripped, and this entire free or extending portion is upset while the stock is gripped by the gripping means, by an endwise pressure on the end of the free portion of the stock toward the gripped portion to reduce the length thereof a predetermined amount, which results in an upset portion of a predetermined size, that is sheared off to produce a slug of a predetermined size, that is immediately moved to the forging dies to carry out the forging operation, or operations.

In order to avoid dropping of the scale on any of the operating parts of the machine for producing the scale free slug, the gripping means is so constructed and arranged that the stock is held in a horizontal position and is moved endwise horizontally through the gripping means to engage a movable abutment spaced a predetermined distance from the gripping means to measure off a predetermined length of the stock that is to be used to form the article that is to be produced. After the stock is gripped by the gripping means, with a predetermined length extending therefrom to the abutment, which length comprises an unconfined portion, which is referred to herein as a free portion, that lies between the gripped portoin and the abutment, the distance between the abutment and the gripped portion is reduced to upset the free portion. This is done while the stock is still in its plastic condition suitable for carrying out a forging operation. After this free portion has been upset, it is sheared off closely at the gripped portion thereof and the resulting slug is immediately moved to the forging dies and forged into the desired shape.

Other objects and advantages of my invention will appear as the description of the drawings proceeds. I desire to have it understood, however, that I do not intend to limit myself to the particular details shown or described, except as defined in the claims.

Figure 1:
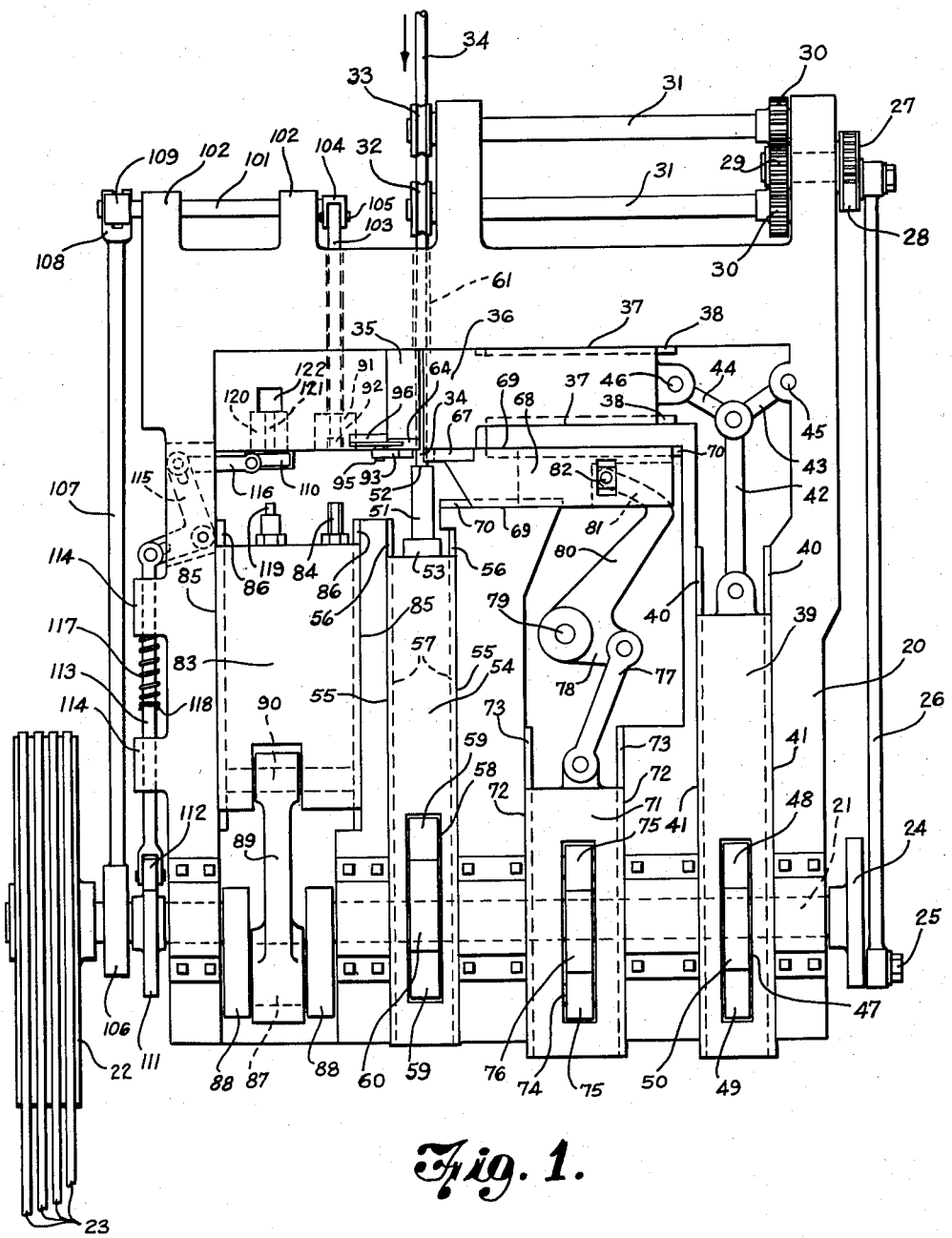
Fig. 1 is a plan view of a forging machine used for carrying out my improved method.

Referring in detail to the drawings, my improved method is carried out by means of a forging machine of the general character shown in Fig. 1 of the drawings, which is of a typical standard make. Such a machine is provided with a heavy frame 20, which is provided with suitable bearings for a main shaft 21, which is provided with a suitable driving pulley 22 driven by any suitable means, as by means of a plurality of belts 23. Mounted on the shaft 21 is a suitable crank disk 24, on which a crank pin 25 is mounted for suitable adjustment toward and away from the center of rotation thereof so as to vary the throw of the crank as may be desired. A connecting rod 26 extends from the crank pin 25 to a ratchet mechanism 27, which is provided with a suitable pawl, or pawls, 28 for driving the shaft on which the pinion 29 is mounted, in a suitable direction, an amount determined by the throw of the crank 24, intermittently, so as to rotate the gears 30, and thus the shafts 31 intermittently in the same direction, which is a direction such as to rotate the feed rolls 32 and 33 in a direction to feed a bar-like member 34 in the direction indicated by the arrow in Fig. 1. It is to be understood that this feeding mechanism is of a standard character and that the gear 29 drives suitable gearing to rotate a pair of shafts, similar to the shafts 31, in the opposite direction thereto, to rotate feed rolls below the feed rolls 32 and 33, paired therewith, in a proper direction to cooperate with the feed rolls 32 and 33 to feed the stock 34 in the direction indicated.

A pair of grooved gripping members 35 and 36 is provided on the machine. The gripping member 35 is mounted in fixed position on the frame 20. The corresponding member 36, which constitutes the movable gripping jaw of the pair, is mounted for longitudinal sliding movement between a pair of guides 37 provided on the frame 20, said movement being transversely of the direction of feed of the stock 34. In order to hold the jaw 36 properly aligned with the jaw 35, a pair of guide ribs 38 is provided on the frame, that engage in suitable guide grooves in the movable gripping jaw 36. Said movable gripping jaw is reciprocated between a position in which the gripping means is open, so that the stock can slide therethrough, and a position in which it is in tight gripping engagement with the stock so as to hold it against any endwise movement while the operations carried out by the machine described below take place.

The reciprocating movements of the movable gripping jaw 36 are obtained by means of a slide 39, which is guided in its sliding movements by means of the guide ribs 40 and the walls 41 of the slideway in the frame of the machine, said slide having a rod 42 pivotally connected therewith at one end, said rod being pivotally connected with the toggle links 43 and 44, one of which is pivotally mounted at 45 on the frame and the other of which is pivoted on the slidable gripping jaw 36 at 46. The slide is provided with a suitable opening 47 therein, in which a pair of rollers 48 and 49 is journaled, said rollers being engaged by a cam 50 mounted on the shaft 21, which is of suitable shape to move the gripping jaw 36 toward and away from the jaw 35 and to hold said jaw 36 in stock gripping relation to the jaw 35 for a desired interval after having moved into gripping relation thereto. In the position of the parts shown in Fig. 1 the jaws 35 and 36 are separated so as to be in open position to permit endwise movement of the stock through the same. The toggle mechanism only moves the jaw 36 a relatively short distance, but due to the character of said toggle mechanism it firmly locks the jaw 36 in cooperative gripping relation to the jaw 35 when in its alternative position.

A plunger 51 having a flat end face 52 is mounted in a suitable mounting member 53 provided on a slide 54 that is mounted in a suitable slideway 55 in the frame 20, said slideway being provided with guide ribs 56 engaging suitable grooves 57 in the slide to assure its accurate sliding movement toward and away from the gripping means 35 and 36. Said slide is provided with a suitable opening 58 therein that is provided with suitable mounting means for rollers 59 that engage a cam 60 mounted on the shaft 21 for moving said slide 54 and the plunger 51 in properly timed relation with respect to the jaw 36.

Figure 2:
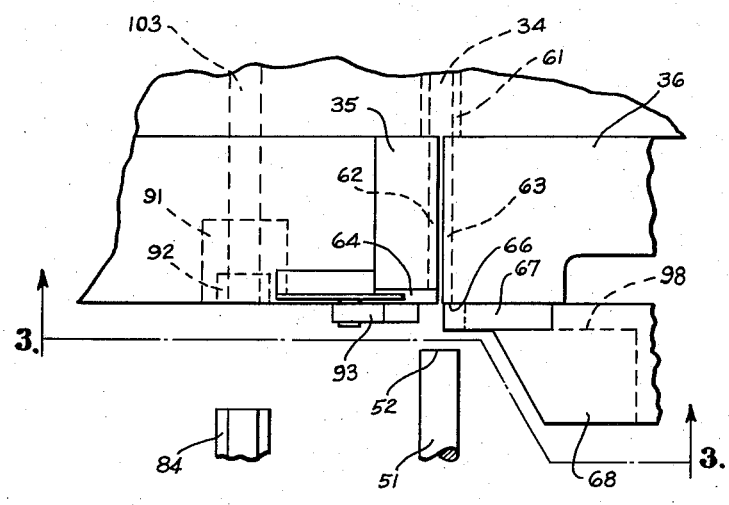
Fig. 2 is a fragmentary plan view of a portion of the machine, showing the gripping means, plunger, shearing means and forging dies partly broken away, the parts being in the position that these assume before the stock has been fed lengthwise through the gripping means.

The feeding means feeds the stock 34 through a suitable opening 61 in the frame and through the gripping means 35 and 36 into engagement with the end wall 52 of the plunger 51 when the jaws 35 and 36 are open, or in their separated position, such as shown in Fig. 1, the stock 34 having engaged the end face 52 of the plunger 51 in the position of the parts shown in Fig. 1. Referring to Fig. 2 it will be noted that the gripping jaw 35 has a groove 62 therein that has its axis extending in the direction of feed of the stock 34 and that the movable gripping jaw 36 has a similar groove 63 therein that is opposite the groove 62, said grooves being of such a curvature that these will firmly engage the stock 34 when the jaw 36 has moved into engagement with the jaw 35.

The stationary gripping member 35 is provided with a stationary shear blade 64, which is provided with a shearing edge portion 65 that cooperates with a cooperating shearing edge 66 on a movable shear blade 67 that is mounted on a slide 68. The slide 68 is mounted between suitable guides 69 in the frame 20 and suitable guide ribs 70 are provided, cooperating with grooves in the slide to guide it so that the shear blade 67 will be properly positioned relative to the shear blade 64. Said slide 68 is moved between its various positions by means of a slide 71 mounted between guideways 72 having guide ribs 73, operating in grooves in the slide 71, provided on the frame 20. Said slide has an opening 74 therein, in which a pair of rollers 75 is mounted for rotation, said rollers engaging a cam 76 mounted on the shaft 21. A connecting rod 77 is pivotally connected with the slide at one end thereof and with the short arm 78 of a bell crank lever pivoted on the frame at 79 and having an arm 80 thereon that has an angular end portion 81 that is pivotally connected at 82 with the slide 68. The cam 76 is of such a character that the slide 68 is moved from a position in which it is spaced to the right of the stationary shear blade, as viewed in Fig. 1, into shearing engagement with said stationary shear blade 64, and past the position at which complete shearing takes place, beyond the shear blade 64 into a position to deliver the sheared off slug to forming mechanism, in a manner to be described below, and is then returned to its position to the right of the shear blade 64, for a repetition of its movements to and through shearing position.

The slide 83 on which is mounted a forming punch 84, is mounted between suitable guides 85 in the frame 20 and suitable guide ribs 86 are provided, cooperating with grooves in the slide 83 to guide it so that the forming punch 84 and other operating members carried thereby will be guided into proper position with respect to cooperating parts of the machine. The shaft 20 is provided with an offset portion 87, that is connected by means of crank arms 88 with said shaft, thus forming a crank shaft portion with which a pitman 89 is connected at one end thereof, the other end of the pitman 89 being mounted on a pivot pin 90 mounted on the slide 83.

A forming die 91 having a cavity 92, having the same shape as the punch 84, is mounted on the frame 20. When the slide 83 moves so that the punch 84 approaches the die 91 the slug which has been moved to proper position between the punch 84 and a cavity 92 in the die 91 will be forced by the punch 84 into the cavity to form the shape desired by the cooperating punch 84 and die 91. In the drawings, the cavity is shown as being hexagonal and the punch as being hexagonal to form a hexagonal nut body.

Figure 3:
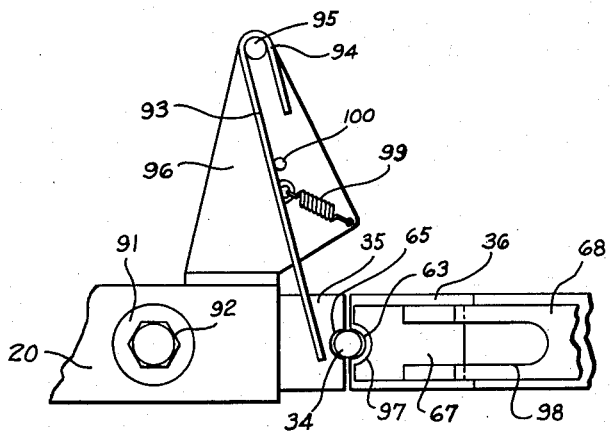
Fig. 3 is a section taken on the line 3—3 of Fig. 2.
Figure 11:
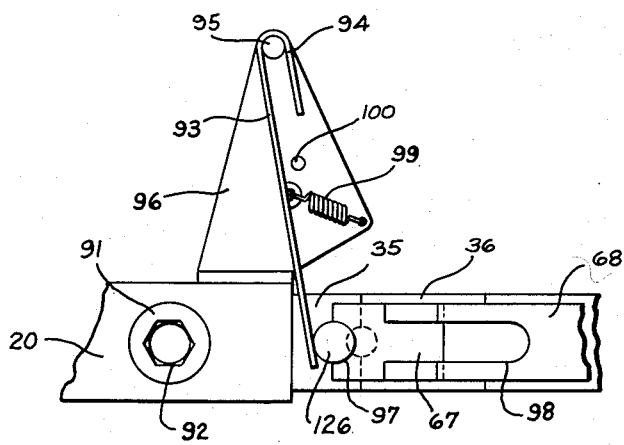
Fig. 11 is a section taken on the line 11—11 of Fig. 10.
Figure 13:
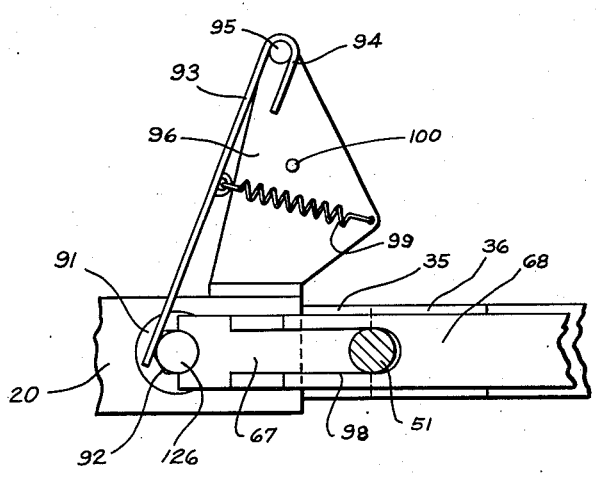
Fig. 13 is a section taken on the line 13—13 of Fig. 12.

The means for moving the slug from the shearing dies to the forming dies 84 and 91 is of a well known character used in forging machines of the character shown in Fig. 1. The movement is accomplished by means of the movable shear blade 67 and what is commonly known as a jump finger 93, which is a flat elongated member, as shown in Figs. 1 and 3 and other figures of the drawings, that has a hook shaped end portion 94 mounted on a pin 95 on an upstanding bracket 96 that is mounted in a well known manner on the frame 20. The finger 93 engages with one side of the slug that is formed from the rod-like stock, as shown in Fig. 11, so as to hold the slug in the recess 97 in the movable shear blade 67 as the shear blade 67 is moved from the position shown in Fig. 9, in which the shearing action thereof begins, to the position shown in Fig. 13, which is the position in which the slug is properly presented for forming between the punch 84 and the cooperating die member 91. The slide 68 is provided with a slot 98 to permit the movement of the shear blade to the position shown in Fig. 13, without interference with such movement by the plunger 51, which extends across the path of movement of the slide 68, as will be obvious from Fig. 1 of the drawings. The finger 93 is urged into engagement with the slug by means of a coil spring 99 connected at its opposite ends with said finger 93 and the bracket 96 and the movement of the finger 93 under the urging of the spring 99 is limited by a lug 100 projecting from the bracket 96. It will be noted that when the finger 93 encounters the punch 84 it is forced upwardly to the position shown in Fig. 15, where it will not in any manner interfere with the cooperative action of the dies 84 and 91.

In the form of machine shown, the nuts produced by the particular machine shown are made in two forming operations, the first of which is carried out by the cooperating dies 84 and 91. Means of a well known character is provided for ejecting the shape formed between the dies 84 and 91 from the cavity 92 of the die and presenting it to the second set of dies that completes the forming of the nut. The ejecting means is shown as being provided with a shaft 101 that is mounted in suitable bearings 102 on the frame 20, which has mounted thereon to oscillate therewith an upstanding arm 104 that has a forked upper end portion thereof in which the cross pin 105 on the ejector pin 103 is mounted. It will be obvious that as the shaft 101 is oscillated back and forth in its bearings the ejector rod 103 will move from the position shown in Fig. 1 to a position to eject the article formed between the dies 84 and 91 seated in the cavity 92 therefrom and that when the shaft 101 is oscillated or rocked in the opposite direction the ejector pin 103 will move back to the position thereof shown in Fig. 1. The oscillating movements of the shaft 101 are produced in a suitable manner, as by means of an eccentric 106, from which the rod 107 extends, which is provided with a forked end 108, with which the depending arm 109 fixed on the shaft 101 to move therewith, is connected.

The shape that has been formed between the dies 84 and 91 and ejected therefrom is transferred, as it is ejected, by means of a transfer cage 110, to the second set of dies shown in the form of machine illustrated in Fig. 1. The transfer cage 110 is moved back and forth between the position shown in Fig. 1 thereof and the position opposite the die 91 by suitable mechanism such as shown in Fig. 1 of the drawings, comprising a cam 111 on the shaft 20 engaged by a roller 112 on the link 113, which is longitudinally slidably mounted in guide ears 114 provided on the frame 20, and which is pivotally connected with a bell crank lever 115 that is pivotally mounted on the frame 20 and has a link 116 connected with the arm thereof that is angularly related to the arm of the bell crank lever to which the link 113 is connected, said link 116 connecting said bell crank lever with the transfer cage 110. A coil spring 117 is mounted between one of the gears 114 and a pin 118 projecting from the rod-like member 113 to hold the roller 112 in engagement with the surface of the cam 111 so that the roller 112 following the cam 111 will cause such movements of the above referred to means connecting the member 113 with the cage 110 that the cage will move in properly timed relation with the other operating mechanism to receive a formed member from the cavity 92 of the die 91 after the plunger 84 has moved away therefrom and will transfer it to the other set of dies shown in Fig. 1, which will now be described.

In the form of apparatus shown in Fig. 1 of the drawings the slide 83 is provided with a piercing die 119, which engages with the article formed between the dies 91 and 84 held by the cage 110, so as to make an opening therethrough, the material punched out, being forced into the passage 121 in the die 120 from which it passes to a discharge opening 122 in the frame 20. It will be obvious that in the operation of the machine shown in Fig. 1 the perforating punch die 119 will move into position to operate on the previously formed article mounted in the cage 110 simultaneously with the engagement of the die 84 with the slug that has been moved into position before the die 91, by means of the shear blade 67 in cooperation with the jump finger 93, and that accordingly the first forming operation on the slug is performed simultaneously with the second operation performed on the partly completed article that has been formed between the dies 84 and 91 and moved over in to proper position for operation thereon by the perforating punch 119 by means of the transfer cage 110.

In carrying out my improved forging method by means of the apparatus shown in Fig. 1, the stock may first be presumed to be in the position shown in Figs. 2 and 3, which is the position that the stock would have just prior to the beginning of a feeding movement by the feed rollers 32 and 33 and the rollers paired therewith. In this position of the parts, the plunger 51 is in proper position for the end wall 52 thereof to act as an abutment limiting the movement of the stock 34 so that the abutment 52 will act as gauging means for the length of stock that is to be operated on in one series of steps of my method. The movable gripping jaw 36 in this position of the parts is spaced from the stationary gripping jaw 35 a sufficient distance that the stock 34 will slide through the jaws 35 and 36, the grooves 62 and 63 in said jaws in this position acting as guiding means for the stock directed toward the plunger 51.

Figure 4:
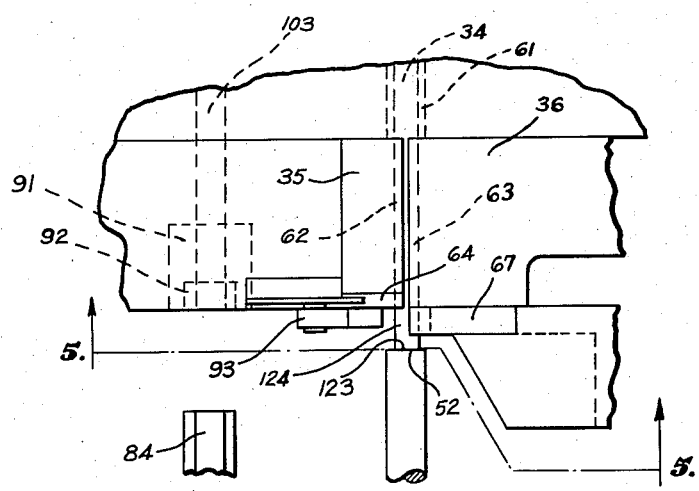
Fig. 4 is a view similar to Fig. 2, showing the position of the parts after the stock has been moved through the gripping means into engagement with the plunger, but before the gripping means has closed.
Figure 5:
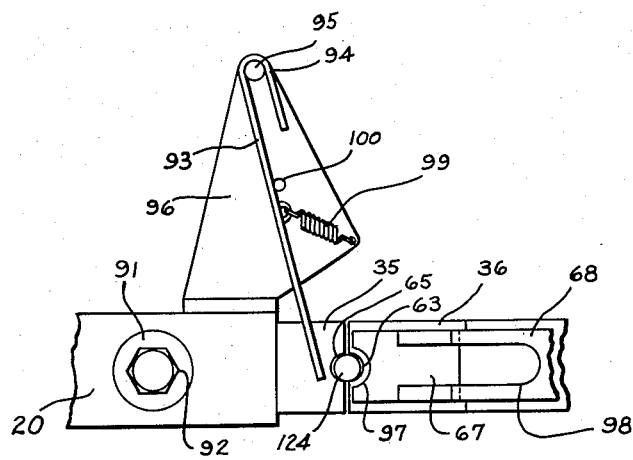
Fig. 5 is a section taken on the line 5—5 of Fig. 4.

In Figs. 4 and 5 the position of the parts is that shown in Fig. 1, in which the stock has been moved by the feeding means so that the end thereof is in engagement with the abutment 52 provided by the end face of the plunger 51, and the jaw 36 still remains spaced from the jaw 35. It will be noted that in Figs. 3 and 5 the jump finger 93 is held in spaced relation to the stock 34 by means of the stop member 100 with which it engages. The stock 34 that is being fed has been heated to a forging heat prior to entry into the machine, this being accomplished in a well known manner ordinarily as the stock is being fed into the machine where the stock 34 is in the form of a continuous length that is fed from a reel to the machine. Also it will be noted that after the first piece of stock has been cut off the length that is being fed the end face 123 of the stock that is in engagement with the abutment 52 on the plunger 51 is freshly cut and scale free.

Figure 6:
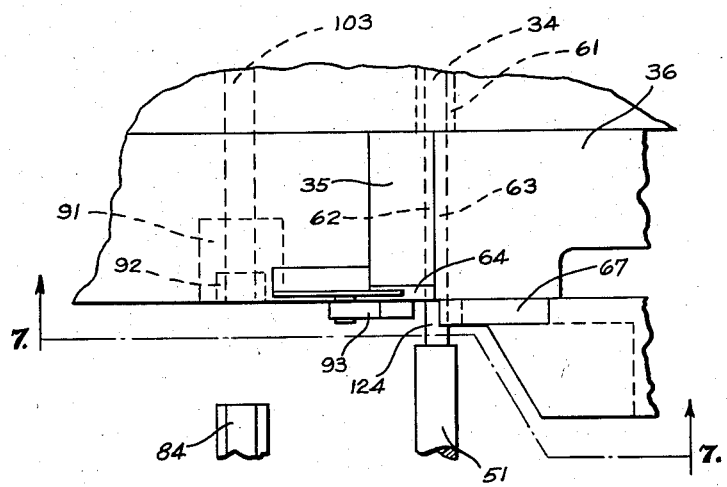
Fig. 6 is a view similar to Fig. 2, showing the position of the parts after the gripping means has closed into stock gripping position and the plunger remains in its gauging position.
Figure 7:
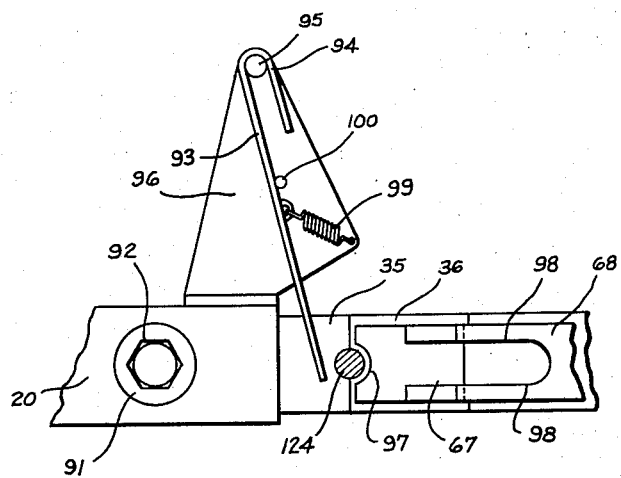
Fig. 7 is a section taken on the line 7—7 of Fig. 6.

The next step in carrying out my method by the machine shown in Fig. 1 is illustrated in Figs. 6 and 7. In this position of the parts the plunger 51 dwells in the position that it had when the stock was first fed into engagement with the end face thereof. However, instead of the movable gripping jaw 36 being spaced from the stationary gripping jaw 35 it has moved into firm gripping relation with respect thereto so as to firmly grip the stock 34 between the jaws 35 and 36 so that the amount of pressure that has to be exerted endwise on the stock to upset the same is insufficient to cause any endwise or lengthwise movement of the stock 34 relative to the jaws 35 and 36. Accordingly the stock is gripped at a predetermined distance from the end 123 thereof when the parts are in this position, and a length 124 of said stock, extending from the end 123 thereof a predetermined distance to the gripping jaws 35 and 36, will be mounted in a horizontal position between the gripping means and the plunger 51, with all of the side surface thereof unconfined, and the portion 124 can thus be referred to as a free portion to distinguish from the portion thereof that is confined and held by the gripping jaws 35 and 36.

Figure 8:
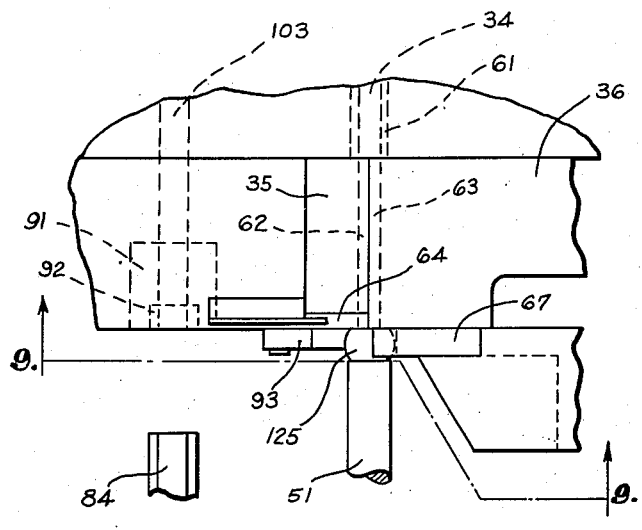
Fig. 8 is a view similar to Fig. 2, showing the gripping means in closed position and the plunger moved to its position of closest approach to the gripping means, with the slug formed between said gripping means and said plunger.
Figure 9:
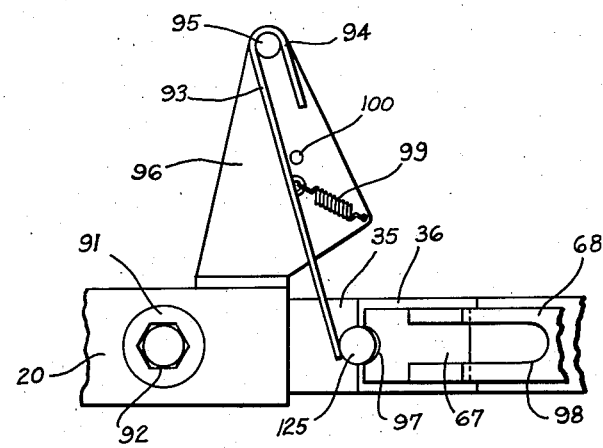
Fig. 9 is a section taken on the line 9—9 of Fig. 8.

The next step in my method is shown as being carried out in Figs. 8 and 9 of the drawings. The operating means for the plunger has now moved the plunger from its gauging position to its position in which the upsetting action performed thereby has been completed. During this movement the gripping jaws 35 and 36 remain in firm gripping engagement with the stock 34 and prevent any endwise movement of the stock or of the portion 124 thereof in the direction of movement of the plunger 51 as it upsets the portion 124, except that movement of the stock that takes place due to the squeezing or upsetting action that is carried out between the face 52 of the plunger 51 and the opposite faces of the gripping jaws 35 and 36. The upsetting action causes a bulging of the length 124 of the stock that protrudes from the jaws 35 and 36 to form an enlargement 125, which is of a definite size, and to crack the scale off the side walls of the projecting portion 124 as it changes in shape to the biscuit-like form it has after being upset. When the upsetting action is completed by the completion of the movement of the plunger 51 to its nearest position of approach to the gripping jaws 35 and 36 the lateral expansion of the material in the length 124 of the stock causes it to engage with the jump finger 93, moving it slightly away from the stock as shown in Fig. 9, so that said jump finger will be yieldingly engaging the bulged portion 125, or biscuit, formed on the end of the stock.

Figure 10:
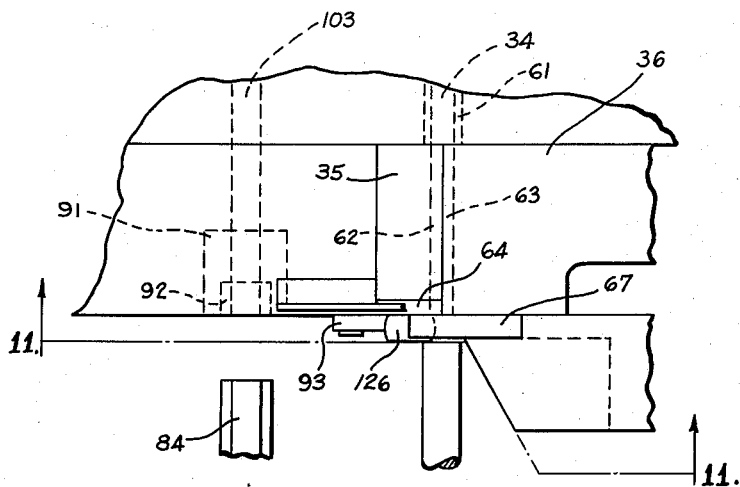
Fig. 10 is a view similar to Fig. 2, showing the position of the parts after the upset s'ug has b en shea ed off and is being moved toward nut form'ng d'es.

With the plunger 51 still in the position that it had when the upsetting action thereof was completed, and the gripping jaws still in their stock gripping position, the movable shear blade 67 is moved from the position thereof shown in Figs. 6 to 9, inclusive, past the cooperating stationary shear blade 64 so as to cause the upset or bulged portion 125 to be sheared off the end of the stock 34 at the face of the gripping jaw 35 directed toward the plunger 51. In Fig. 10 the position of the parts is that in which the bulged portion on the end of the stock, that has been formed by upsetting the extending portion thereof that projected from the gripping jaws, has been completely separated from the stock 34, forming the slug or biscuit 126. The movable shear blade 67 is not halted in the position shown in Fig. 10, but moves continuously from the position shown in Fig. 3 to the position shown in Fig. 13, moving continuously to the left from the first position referred to, to the last position referred to, past the shear blade 64 to shear the upset or bulged portion 125 off the stock 34, and carries the resulting scale free slug or biscuit 126 into position to be acted on by the cooperating die members 84 and 91. It will be noted that the plunger 51 remains in engagement with the enlarged portion 125 until after it has been completely separated from the stock 34 and is confined between the jump finger 93 and the recess in the movable shear blade 67 to be transported into the position between the dies 84 and 91.

Figure 12:
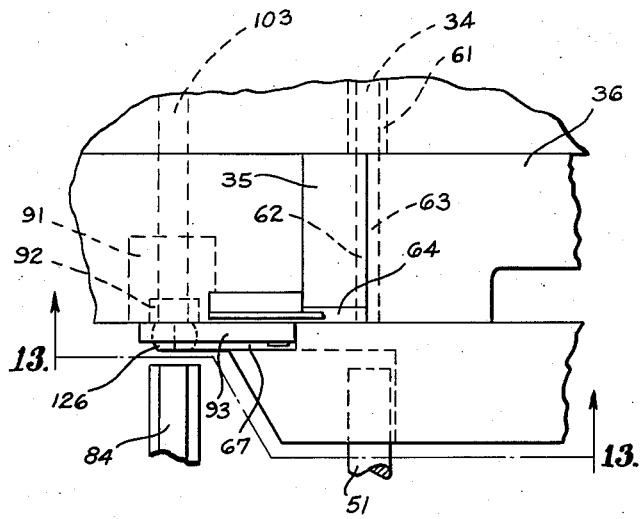
Fig. 12 is a view similar to Fig. 2, showing the position of the parts for delivery of the scale free slug to the forging dies, which may be the first pair of a plurality of pairs of such dies, dependent upon the article that is to be formed.
Figure 14:
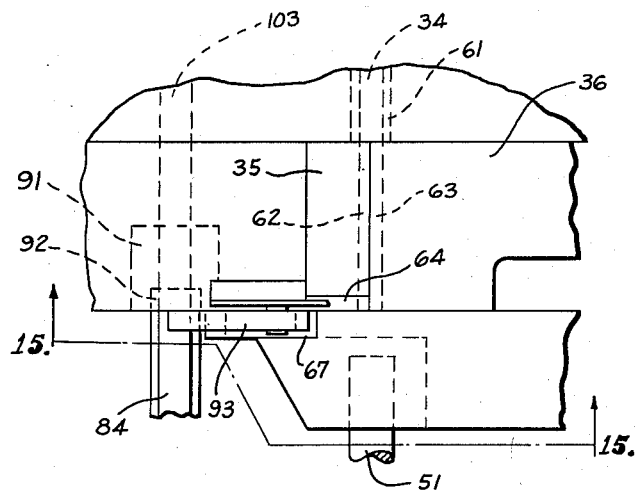
Fig. 14 is a view similar to Fig. 2, showing the parts in the position which they assume when the dies have completed the forging operation performed thereby on the slug.
Figure 15:
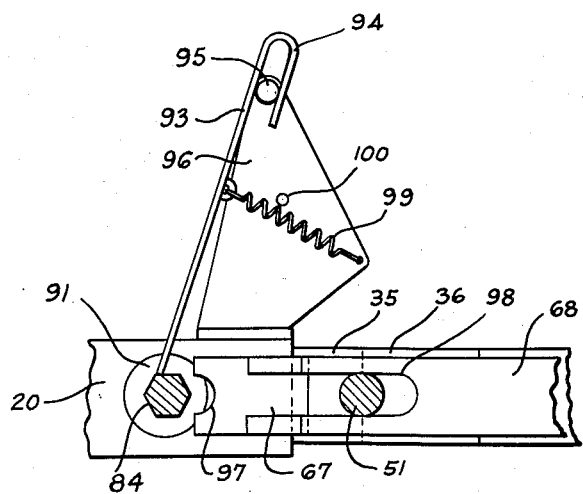
Fig. 15 is a section taken on the line 15—15 of Fig. 14.

After the resulting biscuit or slug 126 has cleared the plunger 51, the plunger moves back to its initial position to serve as gauging means for the next length of stock that is to be fed by the feeding means through the gripping jaws, which at that time have separated so as to be in the position shown in Figs. 2 and 3. After the biscuit or slug 126 has been moved to the position shown in Figs. 12 and 13 the punch die 84 is moved toward the die 91 from the position shown in Fig. 12 to the position shown in Fig. 14 and during such movement the die 84 moves the jump finger out of the way into the position shown in Fig. 15, permitting the die 84 to move into the position with relation to the die 91 to squeeze the biscuit between said dies into the hexagonal shape desired. This hexagonal member formed from the biscuit or slug 126 is of a definite predetermined size because the slug or biscuit is of a definite predetermined size, having been made from a definite predetermined length of material 124, as explained hereinbefore. After the die 84 has engaged the slug to move it into the recess in the die 91, the movable shear blade 67 starts to move back to its original position, which is that shown in Figs. 2 and 3, and moves continuously from the position shown in Fig. 13 to the position shown in Fig. 3. In Fig. 15 this movement has already commenced. After the die member 84 has moved into its final forming position with respect to the die 91, it is withdrawn, and upon withdrawal of the die 84 and return of the same toward its original position, the ejector rod 103 moves to eject the formed article from the cavity 92 of the die 91, the transfer cage 110 in the meantime, having moved over into position to receive the ejected hexagonal member and immediately thereafter returns so as to be in a position in proper alignment with the perforating die 119 to complete the operations on the hexagonal member that has been formed between the dies 84 and 91, it being, of course, understood that the second hexagonal member is being formed between the dies 84 and 91 as the perforating punch 119 acts on the previously formed hexagonal article. As the dies 84 and 91 are forming the hexagonal member between the same, the movable shear blade 67 is returning to its original position, that shown in Figs. 2 and 3, and as soon as this movement is completed the feeding means feeds the end of the stock 34, where it has been sheared off in the formation of the slug 126, into engagement with the end wall 52 of the plunger 51, and the series of operations shown in Figs. 4 to 13, inclusive, are repeated to provide a scale free blank or slug, that is fed into position for the next forming operation of the cooperating forming dies 84 and 91.

By my improved method of first moving a rod-like member, or rod-like stock, with its end into engagement with an abutment to gauge a predetermined length thereof, gripping the stock at a predetermined distance from the end thereof to leave a predetermined portion thereof with its lateral or side wall portion free of any engagement with any other parts and then upsetting the projecting part while gripping the stock beyond the same, shearing the resulting enlargement or biscuit formation off the end of the stock that remains of its original cross section, and transferring the resulting slug to forming dies without removal from the shearing dies, a scale free blank is provided for operation upon by the forming dies and many operations and much apparatus, that would otherwise be necessary, for removing scale and obtaining a scale free blank is eliminated. While the method and apparatus disclosed and illustrated as being set up for forming hexagonal nuts, other articles, that are to be formed by pressing between dies and, in order to obtain a satisfactory product, have to be made from scale free stock, by a hot forging method, can be made in this same manner. It is, of course, to be understood that the various operations carried out in my apparatus in carrying out my method, are carried out while the stock is in a plastic enough condition to carry out all of the various upsetting and forging operations.

What I claim is:

1. In the method of hot forging articles from rod-like metal stock of substantially uniform cross section heated to a plastic state whereby scale is formed on said stock, upsetting a predetermined length of a free exposed end portion of said stock while in said heated plastic state to shorten and thicken said length and thereby crack said scale off said length thereof, shearing said entire upset portion of said stock from the portion thereof that remains uniform in cross section to provide a scale-free surface on the end of said remaining portion of said stock and a slug having scale-free side and end walls, and die shaping said slug immediately after shearing the same off said stock.

2. In the method of hot forming an article from rod-like metal stock of substantially uniform cross section heated to a plastic state whereby scale is formed on said stock, gripping said heated stock at a predetermined distance from one end thereof to provide a free exposed portion of said stock of predetermined length extending from said gripped portion to said end and a confined gripped portion adjacent said free exposed portion, upsetting said free exposed portion throughout its length, while said stock is in said heated plastic state and while gripping said stock as aforesaid, to crack scale off said free exposed portion, shearing said entire upset portion from said stock to provide a slug and die shaping said slug immediately after shearing the same from said stock.

3. In the method of hot forming an article from rod-like metal stock of substantially uniform cross section heated to a plastic state whereby scale is formed on said stock, gripping said heated stock at a predetermined distance from one end thereof to provide a free exposed portion of said stock of predetermined length extending from said gripped portion to said end and a confined gripped portion adjacent said free exposed portion, upsetting said free exposed portion throughout its length, while said stock is in said heated plastic state and while gripping said stock as aforesaid, by pressure on said end toward said gripped portion to shorten and thicken and crack scale off said free exposed portion, shearing said entire upset portion from said stock to provide a slug and die shaping said slug immediately after shearing the same from said stock.

4. In the method of hot forming an article from rod-like metal stock of substantially uniform cross section heated to a plastic state whereby scale is formed on said stock, moving said heated stock lengthwise to engage an end thereof with an abutment, gripping said heated stock at a predetermined distance from said abutment to provide a free exposed portion of said stock of definite length extending from said gripped portion to said abutment and a confined gripped portion adjacent said free exposed portion, upsetting said free exposed portion throughout its length while said stock is in said heated plastic state and while gripping said stock as aforesaid to crack scale off said free exposed portion, shearing said upset portion from said stock to provide a slug, and die shaping said slug immediately after shearing the same from said stock.

5. In the method of hot forming an article from rod-like metal stock of substantially uniform cross section heated to a plastic state whereby scale is formed on said stock, moving said heated stock lengthwise to engage an end thereof with an abutment, gripping said heated stock at a predetermined distance from said abutment to provide a free exposed portion of said stock of definite length extending from said gripped portion to said abutment and a confined gripped portion adjacent said free exposed portion, reducing the distance between said gripped portion and said abutment to upset said free exposed portion throughout its length while said stock is in said heated plastic state and while gripping said stock as aforesaid to crack scale off said free exposed portion, shearing said upset portion from said stock to provide a slug, and die shaping said slug immediately after shearing the same from said stock.

References Cited in the file of this patent

UNITED STATES PATENTS

| | | |
|---|---|---|
| 801,338 | Reid | Oct. 10, 1905 |
| 819,844 | Briede | May 8, 1906 |
| 1,619,494 | Wilcox | Mar. 1, 1927 |
| 1,619,495 | Wilcox | Mar. 1, 1927 |
| 1,929,802 | Brauchler | Oct. 10, 1933 |
| 2,036,758 | Johnson | Apr. 7, 1936 |
| 2,358,378 | Brenholtz | Sept. 19, 1944 |
| 2,698,950 | Haandel | Jan. 11, 1955 |